United States Patent [19]

Hara et al.

[11] Patent Number: 4,924,674
[45] Date of Patent: May 15, 1990

[54] TURBOCHARGER WITH ROTARY ELECTRIC MACHINE

[75] Inventors: Shinji Hara, Fujisawa; Yoshihisa Koizumi, Yokohama, both of Japan

[73] Assignee: Isuzu Motors Limited, Tokyo, Japan

[21] Appl. No.: 251,525

[22] Filed: Sep. 30, 1988

[30] Foreign Application Priority Data

Sep. 30, 1987 [JP] Japan .................. 62-247587

[51] Int. Cl.⁵ .......................................... F02B 37/00
[52] U.S. Cl. ...................................... 60/608; 322/31; 324/174; 417/407
[58] Field of Search ............ 60/607, 608; 310/68 B; 322/31; 324/173, 174; 417/42, 44, 407, 423.1, 423.7

[56] References Cited

U.S. PATENT DOCUMENTS

| | | | |
|---|---|---|---|
| 4,364,005 | 12/1982 | Kohzai et al. | 322/31 |
| 4,502,853 | 3/1985 | Ohi | 417/42 X |
| 4,769,993 | 9/1988 | Kawamura | 60/608 X |

FOREIGN PATENT DOCUMENTS

| | | | |
|---|---|---|---|
| 2568377 | 1/1986 | France | 324/174 |
| 637311 | 5/1950 | United Kingdom | 324/174 |

*Primary Examiner*—Michael Koczo
*Attorney, Agent, or Firm*—Staas & Halsey

[57] ABSTRACT

A turbocharger with a rotary electric machine has a permanent magnet, nonmagnetized metallic member, or surfaces of different light reflectivities fixed upon a rotatable member of the turbocharger, as a detectable means. The detectable means is disposed in a position corresponding to the angular position of magnetic poles of the permanent magnet rotor of the rotary electric machine. A detecting means is disposed in a position coacting with the detectable means for detecting the angular position of magnetic poles of the permanent magnet rotor. A shield means is provided for preventing the detectable means from being adversely affected by magnetic fields, oil, and dust, so that a detected signal of a high S/N raio can be produced for accurately detecting the angular position of the magnetic poles of the permanent magnet rotor as it rotates.

2 Claims, 3 Drawing Sheets

TURBOCHARGER WITH ROTARY ELECTRIC MACHINE

BACKGROUND OF THE INVENTION

1. Field of the Invention

The present invention relates to a turbocharger with a rotary electric machine, which can be driven by the energy of exhaust gases discharged from an internal combustion engine.

2. Description of the Related Art

There has been employed in recent years a turbocharger having an exhaust turbine which is rotatable by the energy of exhaust gases from an internal combustion engine to drive a compressor mounted on the rotatable shaft of the exhaust turbine for charging air into the internal combustion engine. Japanese Laid-Open Patent Publication No. 59-101040 discloses an engine supercharging system including a rotary electric machine mounted on the rotatable shaft of a turbocharger combined with an internal combustion engine. When the internal combustion engine rotates at a low speed, the rotary electric machine operates as an electric motor to increase the boost pressure for increasing the power output from the engine. When the internal combustion engine rotates at a high speed, the rotary electric machine operates as an electric generator to produce electric power for charging a battery. Another turbocharger for an internal combustion engine disclosed in Japanese Laid-Open Patent Publication No. 60-195329 includes a rotary electric machine mounted on the rotatable shaft of the turbocharger, the rotary electric machine being operable as an electric motor or an electric generator dependent on the operating conditions of the internal combustion engine.

For operating a rotary electric machine having a rotor with a permanent magnet, it is necessary to control the phase of electric power supplied to a stator, dependent on the rotation of the rotor, in order to operate the rotary electric machine highly efficiently.

The turbochargers disclosed in the above publications do not have any means for detecting the position of magnetic poles of the rotor which has a permanent magnet. Therefore, in the disclosed turbochargers, it is impossible to control the phase of electric power supplied to the stator dependent on the rotation of the rotor, and thus the rotary electric machine cannot efficiently be operated.

Generally, a magnetic sensor or an optical sensor is employed as a device for detecting the angular position of a rotating body. Where a magnetic sensor is used as a means for detecting the position of magnetic poles of a rotor having a permanent magnet in a rotary electric machine, it is difficult for the magnetic sensor to detect the exact angular position of the rotor. This is due to a magnetic field produced by the strong permanent magnet of the rotor or an intensive magnetic field produced by a large current flowing through the coils of the stator when the rotary electric machine is operated as an electric motor.

An optical sensor employing an optical fiber is advantageous in that it is not adversely affected by any magnetic field. However, it is disadvantageous in that it is susceptible to oil and dust, and its output signal diminishes greatly during operation over a long period of time, thus failing to accurately detect the exact angular position of the rotor.

SUMMARY OF THE INVENTION

It is an object of the present invention to provide a turbocharger with a rotary electric machine having a position detecting means for accurately detecting the angular position of magnetic poles of a rotor without being affected by a magnetic field.

Another object of the present invention is to provide a turbocharger with a rotary electric machine, which has a position detecting means for accurately detecting the angular position of magnetic poles of a rotor without being affected by oil and dust.

According to the present invention, there is provided a turbocharger with a rotary electric machine, including a turbine impeller drivable by the energy of exhaust gases emitted from an internal combustion engine, a rotatable shaft having one end coupled to the turbine impeller, a compressor impeller mounted on the other end of the rotatable shaft, a magnet rotor mounted on the rotatable shaft and having a permanent magnet, and a stator core disposed around the magnet core, the turbocharger comprising: detectable means mounted on a rotatable member of the turbocharger and disposed in a position corresponding to the angular position of a magnetic pole of the magnet rotor; detecting means disposed in a position coacting with the detectable means for detecting the angular position of the detectable means upon rotation thereof; and shield means for protecting the detecting operation of the detecting means by shielding the detecting means from influences coming from other than the detectable means.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1A:
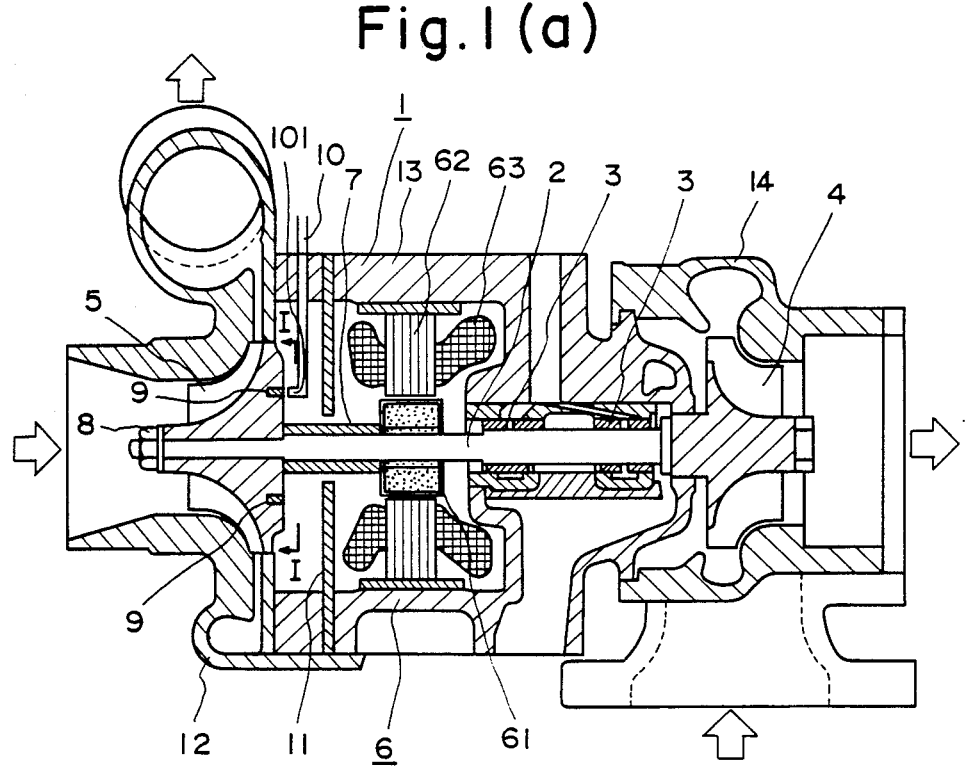
FIG. 1(a) is a cross-sectional view of a turbocharger with a rotary electric machine according to an embodiment of the present invention.
Figure 1B:
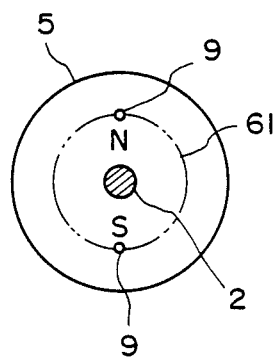
FIG. 1(b) is a cross-sectional view taken along line I—I of FIG. 1(a)

As shown in FIGS. 1(a) and 1(b), a turbocharger housing assembly 1 comprises a turbine housing 14, a compressor housing 12, and a central housing 13 disposed therebetween. A shaft 2 is rotatably supported in the housing assembly 1 by means of a pair of bearings 3. A turbine impeller 4 housed in the turbine housing 14 is mounted on one end of the shaft 2, whereas a compressor impeller 5 housed in the compressor housing 12 is mounted on the other end of the shaft 2.

A rotary electric machine 6 is disposed about the rotatable shaft 2 in the central housing 13 and comprises a magnet rotor 61 mounted on the shaft 2, a stator core 62 disposed in confronting relation to the magnet rotor 61, and stator coils 63 wound on the stator core 62. The magnet rotor 61 is in the form of a cylindrical permanent magnet made of a rare earth element and having an intensive residual magnetism. For operating the rotary electric machine 6 as an electric motor, an electric current is supplied to the stator coils 63. When the rotary electric machine 6 operates as an electric generator, electric power induced within the stator coils 63 is extracted.

Between the rotor 61 and the compressor impeller 5, there is disposed a tubular spacer 7 fitted over the shaft 2. When the compressor impeller 5 is fastened to the shaft 2 by means of a nut 8, the spacer 7 keeps the rotor 61 and the compressor impeller 5 spaced a certain distance from each other.

Permanent magnets 9 corresponding to the position of magnetic poles are embedded in the back of the blades of the compressor impeller 5. Where the permanent magnet of the rotor 61 has two poles N and S, these magnets 9 are positioned in radial alignment with the respective N and S poles as shown in FIG. 1(b).

A magnetic sensor 10 is supported in the central housing 13. The magnetic sensor 10 has on its inner tip end a detector coil 101 disposed in a radial position which confronts the permanent magnets 9 embedded in the back of the blades of the compressor impeller 5. The magnetic sensor 10 serves to detect the angular position of the magnetic poles of the magnetic rotor 61 rotating with the compressor impeller 5 by detecting a change in the magnetic field produced by movement of the permanent magnets 9 upon rotation of the compressor impeller 5. A detected signal is sent from the magnetic sensor 10 to a controller (not shown).

A shield plate 11 is embedded in the central housing 13 between the magnetic sensor 10 and the magnet rotor 61. The shield plate 11 comprises an annular thin steel plate made of a magnetic material such as S10C, S25C, or the like. The shield plate 11 serves to absorb changes in the magnetic field due to rotation of the permanent magnet of the rotor 61 or due to changes in an electric current flowing through the stator coils 63, and to suppress noise which would otherwise be induced in the magnetic sensor 10 by such changes in the magnetic field.

The turbocharger with the rotary electric machine thus constructed will operate as follows: The turbine impeller 4 is driven by the energy of exhaust gases emitted from an internal combustion engine to rotate the compressor impeller 5 which produces and supplies compressed air into the internal combustion engine. When the compressor impeller 5 is rotated, the permanent magnets 9 embedded in the back of the blades thereof are also rotated. A change in the magnetic field from the permanent magnets 9 is detected by the magnetic sensor 10, which then transmits a detected signal to the controller. Since the transmitted signal corresponds to the angular position of the magnetic poles of the magnet rotor 61, the phase or angular position of the magnetic poles of the magnet rotor 61 can accurately be detected and controlled. Since the shield plate 11 is disposed between the magnetic sensor 10 and the magnet rotor 61, the shield plate 11 absorbs changes in the magnetic field due to rotation of the permanent magnet of the rotor 61 or due to changes in an electric current flowing through the stator coils 63, and suppresses noise which would otherwise be induced in the magnetic sensor 10 by such magnetic field changes. Therefore, the detected signal from the magnetic sensor 10 exhibits a good S/N ratio. Inasmuch as the permanent magnets 9 for detecting the angular position of the magnetic poles are embedded in the back of the blades of the compressor impeller 5, they are not adversely affected by centrifugal forces produced when the compressor impeller 5 rotates at very high speeds, and it is easy to make adjustments for rotational balancing of the compressor impeller 5.

Figure 2A:
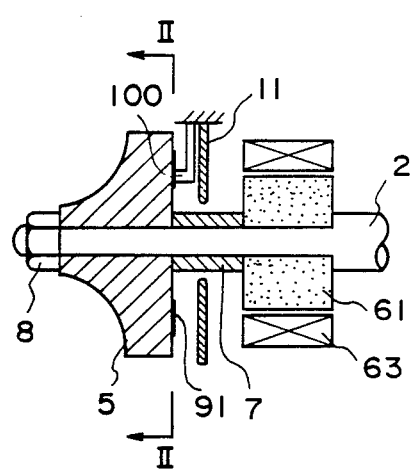
FIG. 2(a) is a fragmentary cross-sectional view of a turbocharger with a rotary electric machine according to another embodiment of the present invention.
Figure 2B:
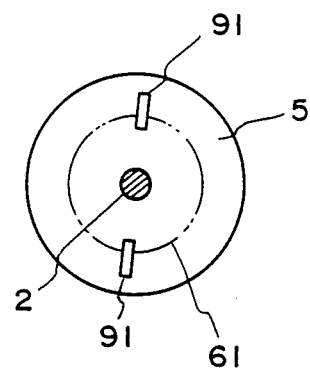
FIG. 2(b) is a cross-sectional view taken along line II—II of FIG. 2(a)

FIGS. 2(a) and 2(b) illustrate a turbocharger according to a second embodiment of the present invention. In the second embodiment, thin amorphous layers 91 of silicon steel are attached to the compressor impeller 5 in place of the permanent magnets 9 in the first embodiment. Those parts in FIGS. 2(a) and 2(b) which are identical to those of FIGS. 1(a) and 1(b) are denoted by identical reference numerals.

In FIGS. 2(a) and 2(b), a compressor impeller 5 is made of a nonmagnetic material such as an aluminum alloy, and nonmagnetized thin layers 91 of amorphous silicon steel are firmly deposited by evaporation on the compressor impeller 5 at radial positions corresponding to the N and S poles of the permanent magnet of the rotor 61. A magnetic sensor 100 has a magnetic pole and a detector coil for detecting a change in the magnetic field which is caused by a magnetic member approaching the magnetic sensor 100. Upon such detection, the detector coil transmits a signal to a non-illustrated controller.

When the compressor impeller 5 and the rotor 61 are rotated, the thin layers 91 of amorphous silicon steel on the compressor impeller 5 are also rotated. Changes are produced in the magnetic field by the aluminum-alloy compressor impeller 5 rotating near the magnetic sensor 100 and the nonmagnetized ferromagnetic thin layers 91. Therefore, the magnetic sensor 100 transmits a detected signal each time one of the thin layers 91 moves past the magnetic sensor 100. Since the transmitted signal corresponds to the angular position of the magnetic poles of the rotor 61, the angular position of the magnetic poles of the rotor 61 as it rotates can accurately be detected. A shield plate 11 is also provided to protect the magnetic sensor 100 from the magnetic fields from the rotor 61 and the stator coils 63. Therefore, the detected signal from the magnetic sensor 100 exhibits a good S/N ratio.

Figure 3A:
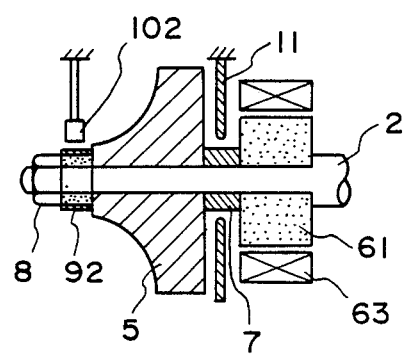
FIG. 3(a) is a fragmentary cross-sectional view of a turbocharger with a rotary electric machine according to still another embodiment of the present invention.
Figures 3B, 3C:
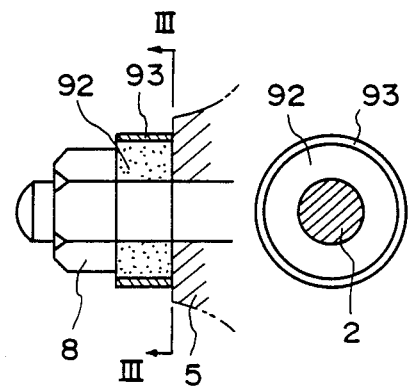
FIG. 3(b) is an enlarged cross-sectional view of a portion of FIG. 3(a)
FIG. 3(c) is a cross-sectional view taken along line III—III of FIG. 3(b)

FIGS. 3(a), 3(b), and 3(c) illustrate a turbocharger according to a third embodiment of the present invention. In the third embodiment, a detecting permanent magnet 92 is disposed between the compressor impeller and the fastening nut. Those parts in FIGS. 3(a), 3(b), and 3(c) which are identical to those of FIGS. 1(a) and 1(b) are denoted by identical reference numerals.

In FIGS. 3(a), 13(b), and 3(c), a tubular detecting permanent magnet 92 is mounted on and around a rotatable shaft 2 and fixed to the distal end of a compressor impeller 5 by means of a nut 8. A thin nonmagnetic protective ring 93 is forced-fitted over the detecting permanent magnet 92 to prevent the latter from being damaged or broken under centrifugal forces when the turbocharger operates at very high speeds. The permanent magnet 92 is magnetized in the same magnetic pole pattern and direction as those of the permanent magnet of the rotor 61 so that the permanent magnet 92 has the same radial distribution of lines of magnetic force as that of the permanent magnet of the rotor 61.

A magnetic sensor 102 has a detector coil for detecting changes in the magnetic field from the detecting permanent magnet 92 as it rotates. A detected signal from the magnetic sensor 102 is sent to a controller (not shown).

In operation, the magnetic sensor 102 detects a change in the magnetic field from the detecting permanent magnet 92, which corresponds to a change in the magnetic field from the rotor 61 as it rotates. Since a shield plate 11 shields the magnetic sensor 102 from the magnetic fields from the rotor 61 and the stator coils 63, the magnetic sensor 102 can produce a detected signal of a high S/N ratio.

Figure 4A:
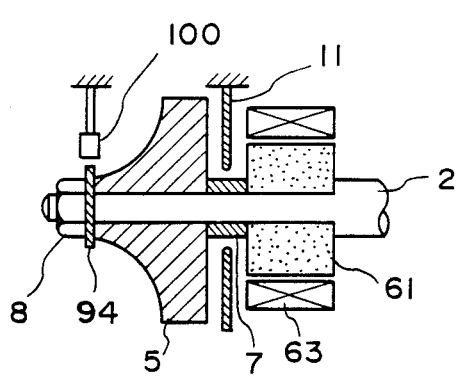
FIG. 4(a) is a fragmentary cross-sectional view of a turbocharger with a rotary electric machine according to yet another embodiment of the present invention.
Figures 4B, 4C:
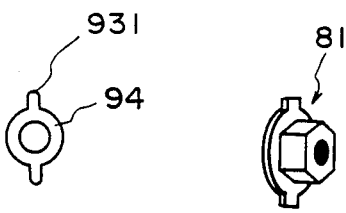
FIG. 4(b) is an enlarged front elevational view of a detecting magnetic member employed in the turbocharger shown in FIG. 4(a)
FIG. 4(c) is a perspective view of a detecting magnetic member according to another embodiment for use in the turbocharger of FIG. 4(a)

FIGS. 4(a) and 4(b) show a turbocharger according to a fourth embodiment of the present invention. In the fourth embodiment, a detected number 94 with projections is disposed between the compressor impeller and the fastening nut. Those parts in FIG. 4(a) which are identical to those of FIGS. 2(a) and 2(b) are designated by identical reference numerals.

In FIGS. 4(a) and 4(b), a ring-shaped nonmagnetized detected metallic member 94 is mounted on a rotatable shaft 2 and fixed to the distal end of a compressor impeller 5 by means of a nut 8. The detected member 94 has on its outer periphery two diametrically opposed projections 931 projecting radially outward and positionally corresponding to the magnetic poles of the permanent magnet of a rotor 61. When the compressor impeller 5 and the rotor 61 are rotated and the projections 931 of the detected member 94 move past a magnetic sensor 100 disposed adjacent thereto, the magnetic sensor 100 detects a change in the magnetic field and transmits a detected signal corresponding to the angular position of the magnetic poles of the rotor 61. The magnetic sensor 100 is shielded by a shield plate 11 from the magnetic fields from the rotor 61 and the stator coils 63.

FIG. 4(c) shows a detected member 81 according to another embodiment, the detected member 81 comprising a washered nut made of a nonmagnetized metallic material and having two radially outward projections.

Figure 5A:
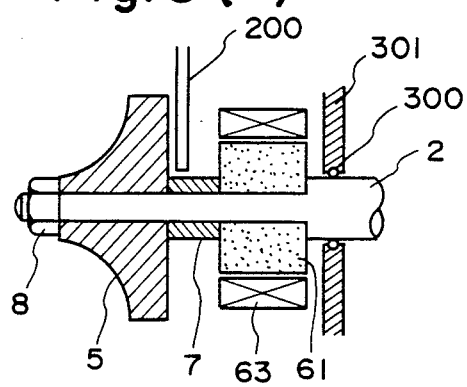
FIG. 5(a) is a fragmentary cross-sectional view of a turbocharger with a rotary electric machine according to a further embodiment of the present invention.
Figure 5B:
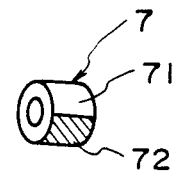
FIG. 5(b) is a perspective view of a spacer employed in the turbocharger illustrated in FIG. 5(a)

FIGS. 5(a) and 5(b) show a turbocharger according to a fifth embodiment of the present invention. Those parts in FIGS. 5(a) and 5(b) which are identical to those of the previous embodiments are denoted by identical reference numerals. According to the fifth embodiment, a spacer 7 has surfaces of different reflectivities, which can be detected through an optical fiber 200 for detecting rotation of a rotor. More specifically, in FIGS. 5(a) and 5(b), a tubular spacer 7 is mounted on a rotatable shaft 2 between a rotor 61 and a compressor impeller 5 and fixedly attached to the rotor 61 and the compressor impeller 5 by means of a nut 8. As shown in FIG. 5(b), the outer periphery of the spacer 7 is coated with a white paint layer 71 and a black paint layer 72. Alternately, the spacer 7 has a surface plated to provide a smooth surface portion and another surface etched to provide a nonreflective surface portion, so that the spacer 7 has surfaces of different light reflectivities. The outer peripheral surface of the spacer 7 is thus coated or treated in different areas oriented in the same direction as the magnetizing direction of the permanent magnet of the rotor 61. The different reflectivities of the outer periphery of the spacer 7 are detected through an optical fiber 200 which supplies a detected signal to a controller (not shown). The rotor 61 and the compressor impeller 5 are separated from the turbine impeller by a partition 301 disposed around the shaft 2 with a seal ring 300 therebetween for preventing the entry of exhaust gases, oil, and the like from the turbine impeller along the shaft 2.

Figure 6A:
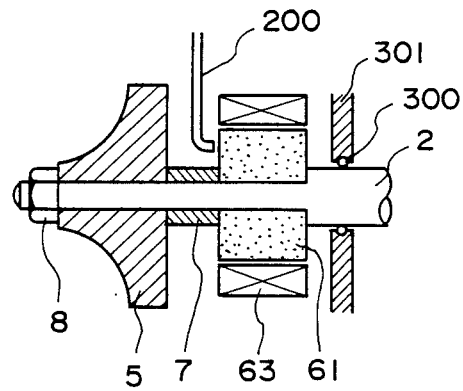
FIG. 6(a) is a fragmentary cross-sectional view of a turbocharger with a rotary electric machine according to a still further embodiment of the present invention.
Figure 6B:
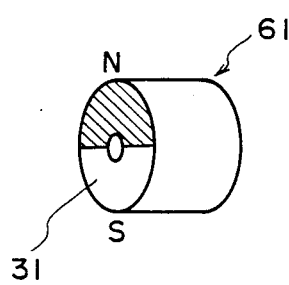
FIG. 6(b) is a perspective view of a magnetic rotor employed in the turbocharger shown in FIG. 6(a).

FIGS. 6(a) and 6(b) show a turbocharger according to a sixth embodiment of the present invention. Those components in FIGS. 6(a) and 6(b) which are identical to those of FIGS. 5(a) and 5(b) are denoted by identical reference numerals. In the sixth embodiment, an axial end side of a rotor 61 is treated to provide different reflectivities in areas oriented in the same direction as the magnetizing direction of the permanent magnet of the rotor 61 itself. The angular position of the magnetic poles of the rotor 61 can be detected through an optical fiber 200 based on the different reflectivities on the rotor 61.

In each of the fifth and sixth embodiments, it is not necessary to attach other parts on the rotatable system. Since the partition 301 and the seal ring 300 prevent the output signal from being lowered in level due to oil, exhaust gases, and dust which would otherwise enter during high-speed rotation and over a long period of time, the detected signal remains stable for an increased period of time.

Although certain preferred embodiments have been shown and described, it should be understood that many changes and modifications may be made therein without departing from the scope of the appended claims.

What is claimed is:

1. A turbocharger with a rotary electric machine, including a turbine impeller drivable by the energy of exhaust gases emitted from an internal combustion engine, a rotatable shaft having one end coupled to the turbine impeller, a compressor impeller having blades and mounted on the other end of the rotatable shaft, a magnet rotor mounted on the rotatable shaft and having a first permanent magnet, and a stator core disposed around the magnet rotor, said turbocharger comprising:

detectable means in the form of a second permanent magnet embedded in at least one of said compressor blades for rotation therewith and positioned to identify an angular position of a magnetic pole of said magnetic rotor;

a magnetic sensor disposed in a position coacting with said second permanent magnet for detecting the angular position of said second permanent magnet upon rotation thereof; and shield means for protecting and shielding said magnetic sensor from external magnetic and mechanical interference, said shield means comprising an annular magnetic thin steel plate disposed between said magnetic rotor and said second permanent magnet.

2. A turbocharger with a rotary electric machine according to claim 1, wherein said magnet rotor includes a plurality of poles and said detectable means includes a plurality of permanent magnets embedded in said compressor blades to identify and angular positions of said magnetic poles.

* * * * *